United States Patent [19]

Freeman

[11] Patent Number: 4,885,934
[45] Date of Patent: Dec. 12, 1989

[54] EXHAUST BACKPRESSURE TESTER

[76] Inventor: Forrest F. Freeman, 4014 SW. Marigold St., Portland, Oreg. 97219

[21] Appl. No.: 140,551

[22] Filed: Jan. 4, 1988

[51] Int. Cl.⁴ .................... G01M 15/00; G01L 7/00
[52] U.S. Cl. ........................................ 73/115; 73/756
[58] Field of Search .............. 73/115, 756, 866.5, 73/146.8

[56] References Cited

U.S. PATENT DOCUMENTS

| | | | |
|---|---|---|---|
| 3,338,102 | 8/1967 | Cain | 73/756 |
| 3,797,317 | 3/1974 | Peterson, Jr. | 73/756 |
| 3,978,719 | 9/1976 | Hadden et al. | 73/115 |
| 4,289,027 | 9/1981 | Gleaves et al. | 73/756 |
| 4,414,851 | 11/1983 | Maglic | 73/756 |
| 4,449,412 | 5/1984 | Fallon et al. | 73/756 |
| 4,515,019 | 5/1985 | Woodfill | 73/756 |
| 4,577,511 | 3/1986 | Wetzel | 73/756 |
| 4,599,902 | 9/1986 | Ferris | 73/756 |
| 4,630,480 | 12/1986 | Betterton et al. | 73/756 |

FOREIGN PATENT DOCUMENTS 669827 12/1938 Fed. Rep. of Germany ........ 73/756

OTHER PUBLICATIONS

MPEP, pp. 700-14,15, 600-28,24, 700-29,30,31,32,33,34.

Primary Examiner—Michael J. Tokar
Assistant Examiner—Robert P. Bell
Attorney, Agent, or Firm—Marger & Johnson Inc.

[57] ABSTRACT

A method and apparatus for determining exhaust backpressure in which a bore is created in the wall of a manifold, pipe, muffler, of the like which is in fluid communication with an exhaust port of an internal combustion engine. A pressure-indicating device of the type having an elongate probe is inserted through the bore in unsealed and unthreaded relation therewith. After reading the backpressure indicated by the device, the probe is withdrawn and a plug is frictionally engaged with the bore thereby sealing against exhaust leakage.

7 Claims, 1 Drawing Sheet

EXHAUST BACKPRESSURE TESTER

Reference is made to disclosure document #157654.

This invention relates to a measuring means specially suited for use in obtaining accurate measurements of the exhaust backpressures present in the exhaust system of an internal combustion engine.

BACKGROUND

Internal combustion engines heretofore have provisions for exhausting gases through an exhaust system for noise and pollution control. It has been found that under certain conditions the passageways in the exhaust system become restrictive resulting in the restriction of the volumetric flow of exhaust gases, creating a higher than normal backpressure in the exhaust system effecting the performance of the engine. The construction of the exhaust systems heretofore normally are not provided with means to measure the amount of pressures creating the backpressure in the exhaust system, therefore it is difficult to diagnose a restrictive exhaust system having a higher than normal backpressure.

SUMMARY

Accordingly the present invention has among its objects to provide an accurate means of measurement of the exhaust backpressures contained within walls of the exhaust system.

Another object is to provide access to the exhaust backpressures by the fabrication of suitable orifices where needed in the wall confining the exhaust backpressures.

Another object is to provide a probe with a hollow passageway to be inserted into the fabricated orifice of the wall to provide a means of transmission of the backpressure to a suitable pressure responsive indicating device to measure the amount of backpressure.

Another objective is to provide a fabricated plug to insert into the fabricated orifice in order to prevent any leakage of exhaust gasese.

Another object is to provide a simple easy inexpensive measurement of the exhaust backpressures.

Another object is to provide diagnoses of the internal combustion engine exhaust backpressures with out any disassembly of the exhaust system.

Other objects and attendant advantages of this invention will be apparent from the following description taken in connection with the accompanying drawings in which.

Figure 1:
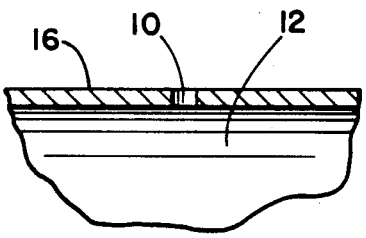
FIGS. 1, 2, 3 are a cross-sectional embodying my invention.

Referring to FIG. 1 of the drawing showing a orifice 10 that has been fabricated through the wall 16, the orifice may be fabricated in any desirable location in the exhaust system.

Figure 2:
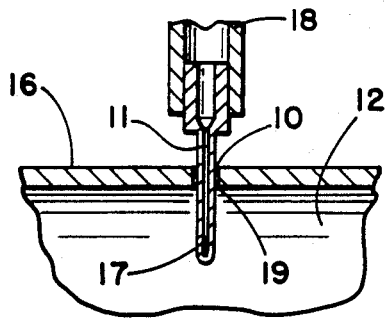

FIG. 2 of the drawing showing the probe 11 with a hollow passageway 17 that has been inserted into position inside the orifice 10 thereby transmitting the exhaust backpressures 12 through the hollow passageway 17 with in the probe 11 and the adapter 18 for connection to a suitable pressure responsive gauge. The probe 11 having an outside diameter dimension slightly smaller than the inside diameter dimension of orifice 10 providing clearance 19 to allow easy insertion of probe 11 into orifice 10, how ever the clearance 19 not great enough to allow any appreciable escapement of exhaust backpressure 12 to effect the accuracy of the pressure responsive device measuring the exhaust backpressure 12 enveloped within the walls 16.

Figure 3:
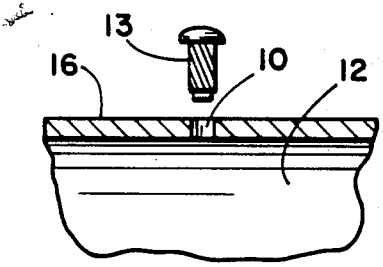

FIG. 3 of the drawing showing a fabricated plug 13 to plug orifice 10, to seal the wall 16 after removing probe 11 to prevent escapement of exhaust gases.

Figure 4:
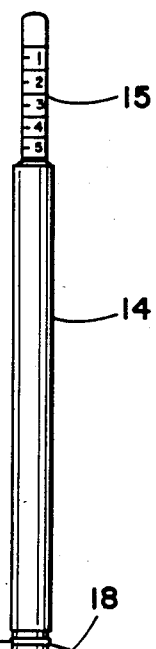
FIG. 4 is a view of an internal combustion engine exhaust manifold not showing the engine fastened, or the exhaust system connected, and the probe with a suitable pressure responsive gauge attached.
Figure 4:
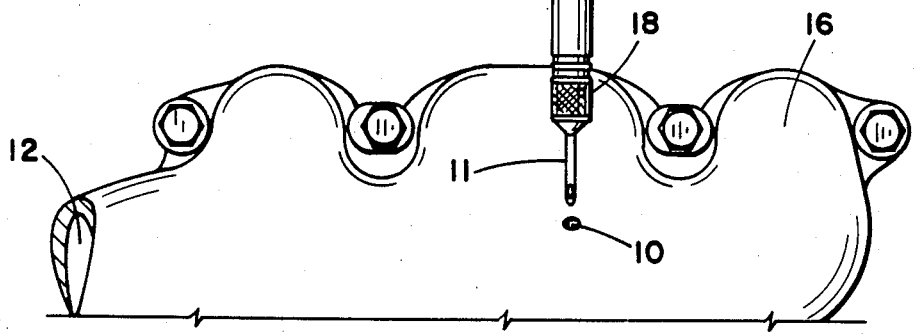

FIG. 4 showing the probe 11 with adapter 18 and one type of a pressure responsive gauge 14 attached in a relative view with the exhaust manifold 16 such as the removal of the probe 11 from orifice 10 in actual use, with the gauge 14 showing the amount of exhaust backpressure with the indica 15.

The embodiments of the invention are exceedingly easy, simple and inexpensive as compared with the prior art of diagnosing exhaust backpressure by the heretofore method of disconnection or replacement of the exhaust system components to verify the exhausting gas flow capability of the exhaust system of an internal combustion engine used in motor vehicles and the like.

It is therefore understood that the invention is not restricted to the apparatus herein illustrated and described as various changes may be made in size and shape of the parts, and in the character of the elements without departing from the spirit and scope of the invention as set forth in the following claims.

I claim:

1. Apparatus for measuring exhaust backpressure in an internal combustion engine, said apparatus in operative condition comprising:
    a pressure indicating device of the type having an elongate probe which communicates fluid pressure to an interior portion of the device;
    an unthreaded bore formed in the wall of a manifold, pipe, muffler or catalytic converter which is in fluid communication with an exhaust port of the internal combustion engine, said probe being received through said bore in unsealed and unthreaded relation therewith; and
    a plug having a diameter sufficient to frictionally engage the radially inner surface of the bore thereby plugging the bore against exhaust leakage after said probe is withdrawn.

2. The apparatus of claim 1 wherein said bore is of a size, relative to said probe, which prohibits escape of exhaust gases in sufficient quantities to affect the accuracy of pressure indicated by said device when said probe is inserted in said bore in unsealed and unthreaded relation therewith.

3. The apparatus of claim 2 wherein said bore has a substantially smooth radially inner surface.

4. A method for measuring exhaust backpressure in an internal combustion engine comprising the steps of:
    providing a pressure indicating device of the type having an elongate probe which communicates fluid pressure to an interior portion of the device;
    locating a wall of a manifold, pipe, muffler, catalytic converter or which is in fluid communication with an exhaust port of the internal combustion engine;
    creating a bore through the wall of a size sufficient to just receive the probe therethrough;
    inserting the probe in the bore in unsealed and unthreaded relation therewith;
    reading the backpressure indicated by the device;
    withdrawing the probe from the bore; and inserting a plug into the bore, said plug having a diameter sufficient to frictionally engage the radially inner surface of the bore thereby plugging the bore against exhaust leakage.

5. The method of claim 4 wherein the step of creating a bore through the wall comprises the step of drilling a bore of a size which prohibits escape of exhaust gasses in sufficient quantities to affect the accuracy of the backpressure reading when said probe is inserted in said bore in unsealed and unthreaded relation therewith.

6. The method of claim 5 wherein the step of creating a bore in the wall comprises the step of creating a bore having a substantially smooth radially inner surface.

7. The method of claim 6 wherein the step of reading the backpressure indicated by the device comprises the step of reading the backpressure without sealing between the probe and the bore.

* * * * *

UNITED STATES PATENT AND TRADEMARK OFFICE
CERTIFICATE OF CORRECTION

PATENT NO. : 4,885,934
DATED : December 12, 1989
INVENTOR(S) : Forrest F. Freeman It is certified that error appears in the above-identified patent and that said Letters Patent is hereby corrected as shown below:

<u>Column 1</u>: Line 34: Change "witha" to --with a--;
Line 41: Change "gasese" to --gases--;
Line 45: Change "with out" to --without--;
Line 51: Delete "a"
Line 51: Insert --views-- between the words cross-sectional and embodying;
Between Line 56 and Line 57: Insert --Detailed Description--;
Line 61: Change "showing" to --shows--;
Line 65: Change "with in" to --within--;

<u>Column 2</u>: Line 2: Change "how ever" to --however--;
Line 2: Insert --is-- between the number 19 and the word not;

UNITED STATES PATENT AND TRADEMARK OFFICE
CERTIFICATE OF CORRECTION

PATENT NO. : 4,885,934

DATED : December 12, 1989

INVENTOR(S) : Forrest F. Freeman

It is certified that error appears in the above-identified patent and that said Letters Patent is hereby corrected as shown below:

Line 7:  Change "showing" to --shows--;

Line 10:  Change "showing" to --shows--.

<u>Title</u>:  Replace "EXHAUST BACKPRESSURE TESTER" with -- METHOD AND APPARATUS FOR DETERMINING EXHAUST BACKPRESSURE--;

Signed and Sealed this

Twentieth Day of November, 1990

*Attest:*

HARRY F. MANBECK, JR.

*Attesting Officer*          *Commissioner of Patents and Trademarks*